US012789499B2

(12) United States Patent
Brennan et al.

(10) Patent No.: US 12,789,499 B2
(45) Date of Patent: Nov. 10, 2026

(54) LAMINATE MATERIAL

(71) Applicant: Joby Aero, Inc., Santa Cruz, CA (US)

(72) Inventors: Joseph Daniel Brennan, Scotts Valley, CA (US); John Angely Geriguis, Capitola, CA (US); Nobuya Kawamura, Seaside, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 399 days.

(21) Appl. No.: 18/352,566

(22) Filed: Jul. 14, 2023

(65) Prior Publication Data

US 2024/0165909 A1 May 23, 2024

Related U.S. Application Data

(60) Provisional application No. 63/389,652, filed on Jul. 15, 2022.

(51) Int. Cl.
*B32B 27/18* (2006.01)
*B32B 3/18* (2006.01)
(Continued)

(52) U.S. Cl.
CPC ................ *B32B 3/18* (2013.01); *B32B 7/022* (2019.01); *B32B 9/007* (2013.01); *B32B 9/045* (2013.01); *B32B 27/18* (2013.01); *B32B 27/28* (2013.01); *B32B 2262/101* (2013.01); *B32B 2307/54* (2013.01); *B32B 2605/18* (2013.01); *B64C 2001/0072* (2013.01); *B64C 3/187* (2013.01); *B64C 3/26* (2013.01)

(58) Field of Classification Search
CPC ................ C12Q 1/6827; C12Q 1/6886; C12Q 2600/106; C12Q 2600/156; C12Q 2537/143; C12Q 2537/16; C12Q 2537/165; G16B 20/10; G16H 20/10; G16H 40/67; Y02W 10/10; B32B 2262/101; B32B 2307/54; B32B 2605/18; B32B 27/18; B32B 27/28; B32B 3/085; B32B 3/18; B32B 7/022; B32B 7/04; B32B 9/007; B32B 9/045; B64C 2001/0072; B64C 3/18; B64C 3/187; B64C 3/26; F16B 11/006; F16B 5/00
See application file for complete search history.

(56) References Cited

U.S. PATENT DOCUMENTS

| | | | |
|---|---|---|---|
| 9,481,127 | B2 | 11/2016 | List et al. |
| 2005/0077427 | A1 | 4/2005 | Brenner et al. |
| 2019/0337261 | A1 | 11/2019 | Calder et al. |

FOREIGN PATENT DOCUMENTS

| | | | |
|---|---|---|---|
| GB | 1050884 A | | 1/1900 |
| WO | WO 2002022440 A1 | | 3/2002 |

OTHER PUBLICATIONS

International Search Report and Written Opinion for PCT Application PCT/US2023/027794, mailed Nov. 21, 2023, 10 pages.

(Continued)

*Primary Examiner* — Lawrence D Ferguson
(74) *Attorney, Agent, or Firm* — Dority & Manning, P.A.

(57) ABSTRACT

A laminate material for an aircraft component is provided. The laminate material includes a first layer, a second layer and a rib disposed between the first and second layer. One or more connectors are configured to couple the ends of the rib to the first layer and the second layer. The connectors comprise a thermoplastic resin. Aircraft components are also provided.

19 Claims, 14 Drawing Sheets

(51) Int. Cl.

| | |
|---|---|
| ***B32B 7/022*** | (2019.01) |
| ***B32B 9/00*** | (2006.01) |
| ***B32B 9/04*** | (2006.01) |
| ***B32B 27/28*** | (2006.01) |
| *B64C 1/00* | (2006.01) |
| *B64C 3/18* | (2006.01) |
| *B64C 3/26* | (2006.01) |

(56) References Cited

OTHER PUBLICATIONS

Invitation to Pay Additional Fees for Application No. PCT/US2023/027794, mailed Sep. 8, 2023, 2 pages.

LAMINATE MATERIAL

Subject matter in the present disclosure was developed by parties under a joint research agreement that was in effect on or before the filing of this application. Subject matter in the present disclosure was made as a result of activities undertaken within the scope of the joint research agreement between the parties. The parties to the joint research agreement are Joby Aero, Inc. and Toyota Motor Corporation.

RELATED APPLICATIONS

This application claim priority to U.S. Provisional Patent Application No. 63/389,652 filed on Jul. 15, 2022, which is incorporated herein by reference.

FIELD

The present disclosure relates to structures that include laminate material, more specifically to structures that include a laminate material that can be used to form components for an aircraft.

BACKGROUND

Aircraft components can be formed from a variety of materials depending on the overall tolerance requirements for the component and its intended use. Conventionally, metal and metal alloy materials are utilized for numerous aircraft components, however, heavy metal components add weight to the aircraft, which decreases operating efficiency. Carbon-based materials or composite materials can be utilized in place of metal components for certain aircraft components. Such lighter weight materials are desirable for increasing the operating efficiency of the aircraft. However, composite materials must be manufactured to withstand a variety of tolerances to be suitable for use. As such, improved materials for aircraft components are needed.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
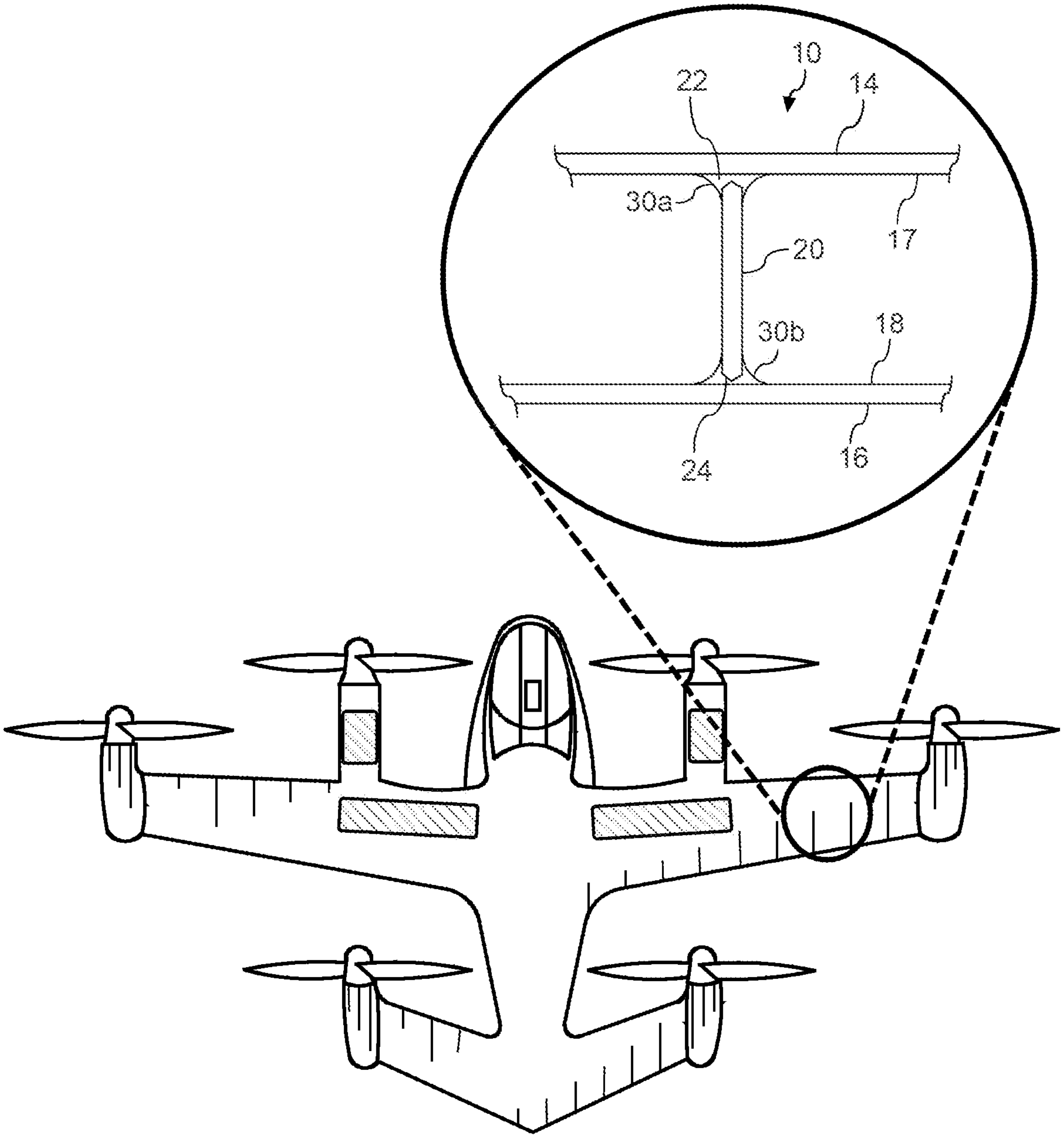
FIG. 1 is a cross-sectional view of a portion or component of an aircraft that includes laminate material in accordance with an example aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The present disclosure is generally related to designs of aircraft and/or aircraft components comprising laminate material. Specifically, the laminate material includes a closed, integrated structure that is capable of transferring shear loads from outer layers of the material more efficiently. For instance, the laminate material can be utilized to form an aircraft wing. In such embodiments, utilization of the laminate material provides a wing structure that is more efficient in transferring shear loads across the wing structure.

Referring now to the drawings, wherein identical numerals indicate the same elements throughout the figures, FIG. 1 depicts a cross-sectional view of a portion or component of an aircraft that includes laminate material 10 in accordance with aspects of the present disclosure. As shown, the laminate material 10 includes a first layer 14 and a second layer 16. A rib 20 is disposed between the first layer 14 and the second layer 16. The rib 20 includes a first end 22 oriented towards the first layer 14 and a second end 24 oriented towards the second layer 16. Connector **30*a* is disposed between the first layer 14 and the first end 22 and connector 30*b* is disposed between the second layer 16 and the second end 24. Specifically, the connectors 30*a*, 30*b* are respectively coupled to an inner surface 17 of the first layer 14 and an inner surface 18 of the second layer 16**.

The first layer 14 and the second layer 16 can be formed from any suitable material including metals or metal-based materials, carbon-based or carbon-containing materials, or composite materials. For instance, in certain embodiments the layers 14,16 can be formed from aluminum or aluminum oxide materials, such as black aluminum oxide. In other embodiments, the layers 14,16 include carbon-containing materials, such as amorphous carbon film materials, diamond-like carbon (DLC) film materials, graphite materials, or graphene materials.

In certain embodiments, the layers 14,16 can be formed from a composite material. Composite materials may include, but are not limited to, metal matrix composites (MMCs), polymer matrix composites (PMCs), or ceramic matrix composites (CMCs).

Composite materials generally include a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers. Materials for forming CMC or PMC materials include silicon carbide (SiC), silicon, silica, or alumina matrix materials and combinations thereof.

Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). PMC materials can be produced by dispersing dry fibers into a mold, and then flowing matrix material around the reinforcement fibers. Resins for PMC matrix materials can include either thermoset resins or thermoplastic resins.

The rib 20 can be formed from the same type of materials as the layers 14, 16 as described hereinabove. For example, the rib can be composed of a laminate material (e.g., fiber and matrix) having the fibers optimized in thickness and fiber directions to maximize load transfers between the layers 14, 16. Such optimization of rib materials, including selection of matrix materials and fibers, can be selected based on known principles.

In embodiments the first layer 14, second layer 16, and rib 20 can be made from composite materials. For instance, the first layer 14, second layer 16, and rib 20 can be made from multiple layers (e.g., plies) of composite material until a desired thickness is achieved. In embodiments, the thickness of the rib 20 is less than or equal to the thickness of the first layer 14 and/or the second layer. Thus, the first layer 14 and/or the second layer 16 can have a greater thickness as compared to the rib 20. In certain embodiments, the thickness ratio between layer and the rib is from about 1:1 to about 3:1.

The connector 30 includes a thermoplastic resin. Generally, thermoplastics are characterized by their material properties as a function of temperature. Most thermoplastics have a high molecular weight due to long polymer chains that are held together by intermolecular forces. Such intermolecular forces rapidly weaken with increased temperature yielding a viscous liquid. Accordingly, thermoplastic materials are deformable in a temperature between an upper transition temperature $T_m$ and a lower transition temperature $T_g$. Above $T_m$, thermoplastic materials melt to form a liquid. Below $T_g$ they enter a brittle, glassy state.

In the temperature range between $T_g$ and $T_m$, thermoplastics typically include a mixture of amorphous and crystalline regions. The amorphous regions contribute to the elasticity/deformability of a thermoplastic in this phase. Further, thermoplastic resins can be processed via a variety of techniques including injection molding, compression molding, calendering, and extrusion. Thermoplastic materials exhibit good mechanical qualities and can operate at relatively high temperatures, due to their high melting points.

Various thermoplastics may be used in accordance with aspects of this disclosure. This can include polyarylketones such as polyether ether ketone (PEEK), polyetherketone (PEK), polyetherketoneetherketoneketone (PEKEKK), polyetherketoneketone (PEKK). Other examples of suitable thermoplastics include polyarylsulphones and polyarylimides. In certain embodiments, the thermoplastic resin can include polyphenylene sulfide (PPS). Other suitable thermoplastics include acrylics, acrylonitrile butadiene styrene (ABS), Nylon, poly lactic acid (PLA), polybenzimidazole (PBI), polycarbonate (PC), polyether sulfone (PES), polyoxymethylene (POM), polyetherimide (PEI), polyethylene (PE), polyphenylene oxide (PPO), polyphenylene sulfide (PPS), polypropylene (PP), polystyrene, polyvinyl chloride (PVC), polyvinylidene fluoride (PVDF), or combinations thereof.

The thermoplastic utilized can be blended with any number of additives as desired in order to increase or decrease certain characteristics of the polymer. For instance, additives can be included to either increase or decrease the brittleness of the polymer or to increase or decrease the mobility of amorphous chain segments in order to increase or lower the glass transition temperature as desired. Such additives are known and include plasticizers, fillers, thickeners, antioxidants, colorants, dyes, or combinations thereof.

Fibers can be disposed within the resin. For example, fibers can be added to provide additional strength to the connector material or to further facilitate load transfer among the laminate 10. The fibers dispersed in the thermoplastic resin can include fiberglass fibers, such as chopped fiberglass fibers. The fiberglass fibers can include a variety of glass materials such as E-glass, S-glass, A-glass, D-glass, R-glass, or combinations thereof. In certain embodiments, the fiberglass fibers include E-glass or S-glass. Other suitable fibers include glass fibers, polymer fibers, boron fibers, monofilament or multi-filament silicon-carbide-based fibers, or combinations thereof.

As noted, the fibers can be chopped fibers, meaning that the fibers are not continuous or substantially continuous fibers. In such embodiments, the fibers may have an average fiber length of from about 0.1 inches to about 0.7 inches, such as from about 0.2 inches to about 0.6 inches, such as from about 0.3 inches to about 0.5 inches. In certain embodiments, the fibers have an average fiber length from about 0.25 inches to about 0.5 inches. In other embodiments, the fibers have an average fiber length of 0.01 mm to about 0.5 mm, such as about 0.09 mm to about 0.2 mm, such as about 0.1 mm. As used herein "average fiber length" is a statistical average length of fibers in the material. Methods for measuring fiber lengths are known and can be measured by microscopy, by classification with screens, or with optical scanners.

As noted, the fibers can be dispersed in the thermoplastic resin. For example, in certain embodiments, the fibers are homogenously dispersed throughout the thermoplastic resin. The weight percentage of the thermoplastic material is from about 20% to about 100%, such as from about 30% to about 95%, such as from about 40% to about 90%, such as from about 40% to about 80%, such as from about 40% to 60%. Accordingly, the weight percentage of the fibers can be from about 0% to about 50%, such as from about 5% to about 45%, such as from about 10% to about 40%, such as from about 15% to about 35%, such as from about 20% to about 30%. In certain embodiments, the weight percentage of the fibers is not more than 50%. Further, in embodiments where no fibers are utilized the weight percentage of thermoplastic material can be about 100%.

In some embodiments, the connectors 30*a*, 30*b* have a lower modulus of elasticity as compared to the layers 14, 16. In such embodiments, the connectors 30*a*, 30*b*, due to their lower modulus of elasticity, are better able to transfer shear loads from the layers 14, 16. For example, the ratio of the modulus of elasticity of the layers 14, 16 to the connectors 30*a*, 30*b* can be at least 1.5:1, such as at least about 2:1, such as at least about 3:1, such as at least about 4:1, such as at least about 5:1, etc. However, it should be noted that too large of an elastic modulus mismatch between the connectors 30*a*, 30*b* and the layers 14,16 can cause delamination and failure between the connectors 30*a*,30*b* and the layers 14,16.

Figure 2:
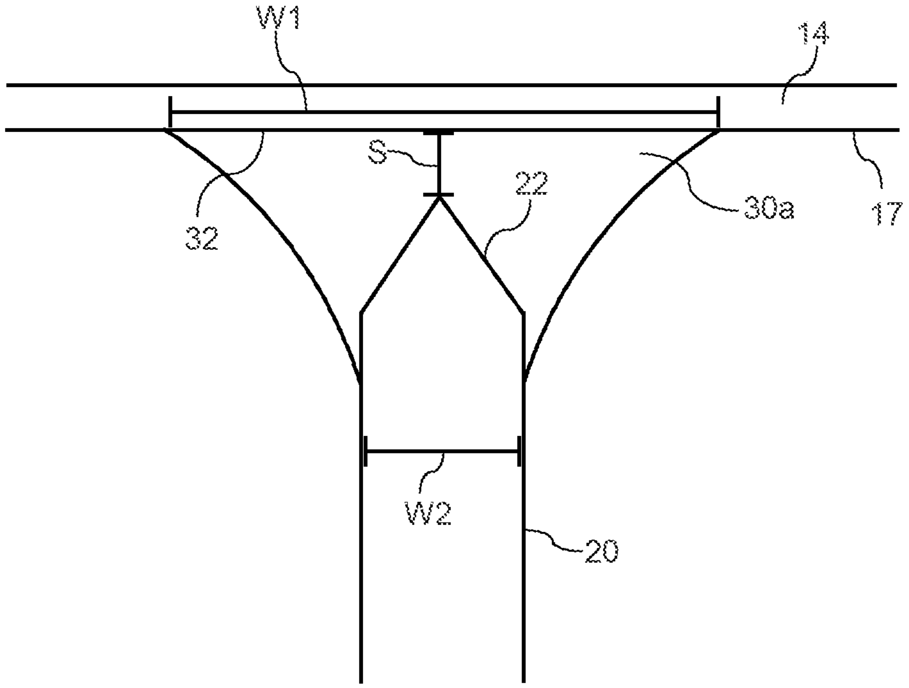
FIG. 2 is a partial cross-sectional view of a portion of a laminate material for a component of an aircraft in accordance with an example aspect of the present disclosure.

Referring now to FIG. 2, illustrated is an enlarged cross-sectional view of the first end 22 of the rib 20 and the first layer 14. The connector 30*a* couples the first end 22 of the rib 20 to the first layer 14. The connector 30*a* has a first surface 32 that is disposed on an inner surface 17 of the first layer 14. The first surface 32 has a width W1 that is larger than the width W2 of the rib 20. For example, the ratio of W1 to W2 can be from about 1.5:1 to about 10:1, such as from about 2:1 to about 9:1, such as from about 3:1 to about 8:1, such as from about 4:1 to about 7:1, such as from about 5:1 to about 6:1, etc. In certain embodiments, the ratio of W1 to W2 is at least about 2:1.

The rib 20 has a first end 22 that is tapered which can increase the surface area of the first end 22 facilitating bonding between the first end 22 and the connector 30*a*. Thus, for example, the width W2 of the rib 20 may decrease towards the tip of the rib 20 at the first end 22. While the tapered end is shown as being triangular in nature, the disclosure is not so limited and can include any tapered ends including ovular, round, trapezoidal, rectangular, etc. The ends 22, 24 can have chamfer angles ranging from about 0° to about 45°, such as from about 5° to about 40°, such as from about 10° to about 35°, such as from about 15° to about 30°, such as from about 20° to about 25°. In certain embodiments, ends 22, 24 of the rib 20 may be flat.

Further, as shown in FIG. 2, in certain embodiments, there is a space S between the inner surface 17 of the first layer 14 and the first end 22 of the rib 20. The connector 30*a* occupies space S such that the first end 22 is not in direct contact with the first layer 14. Moreover, as discussed in greater detail below, a portion of a connector 30*a* may fill the space S between the first end 22 and the first layer 14.

Figure 3:
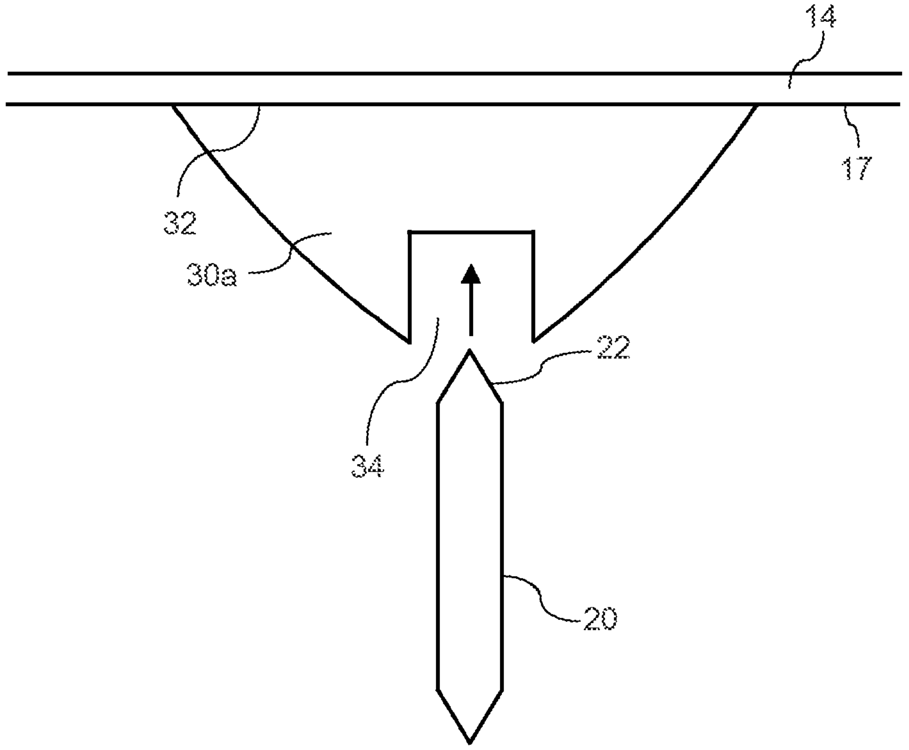
FIG. 3 is a partial cross-sectional view of a portion of a laminate material for a component of an aircraft in accordance with an example aspect of the present disclosure.

Referring now to FIG. 3, a connector 30*a* is disposed on the inner surface 17 of a first layer 14. The connector 30*a* has a first surface 32 that is coupled to the inner surface 17 of the first layer 14. The connector 30*a* can be adhered or bonded to the inner surface 17 via any suitable method. Further, the connector 30*a* includes a cavity 34 into which the end 22 of the rib 20 can be inserted. While a cavity 34 is shown, in other embodiments, it is contemplated that the connector 30*a* is disposed on the inner surface 17 of the layer 14 and that the end 22 of the rib 20 is then pushed into the material of the connector 30*a* such that the connector 30*a* retains the end 22 of the rib 20. For instance, the connector 30*a* can be disposed on the inner surface 17 of the first layer 14 while still in a semi-liquid state, which enables the end 22 of the rib 20 to be pushed into the thermoplastic material of the connector 30*a*.

Figure 4:
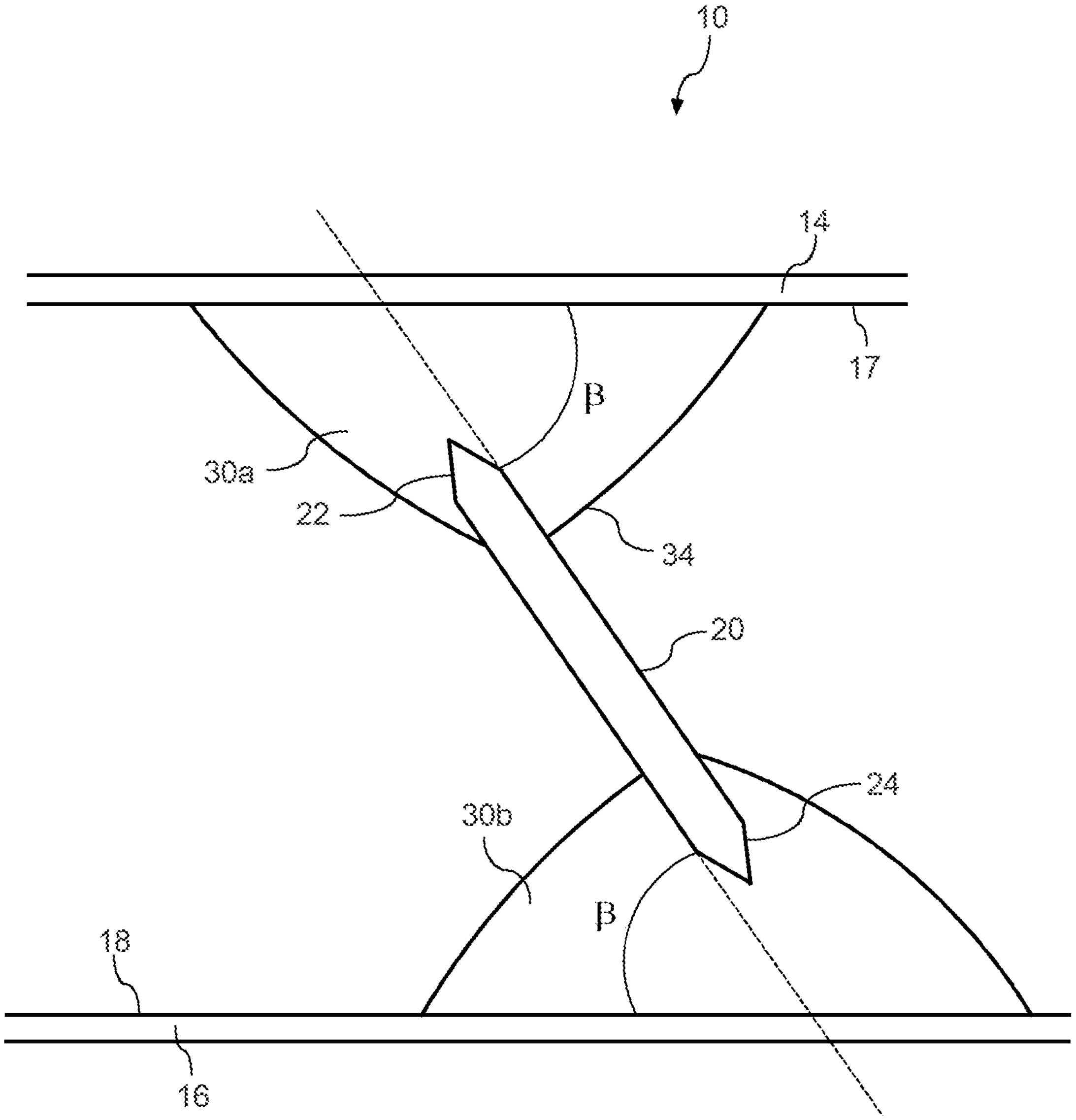
FIG. 4 is a cross-sectional view of a laminate material for a component of an aircraft in accordance with an example aspect of the present disclosure.

Referring now to FIG. 4, the rib 20 can be disposed at an angle between the first layer 14 and the second layer 16. Notably, the rib 20 can be disposed at an angle between the first layer 14 and second layer 16 that is less than 90°. In such embodiments, both the first end 22 of the rib 20 and the second end 24 of the rib 20 form angle β, with respect to the first layer 14 and second layer 16 respectively. In embodiments, angle β is less than 90°, such as between about 10° to about 70°, such as between about 20° to about 60°, such as between about 30° and about 50°. In certain embodiments, angle β is about 45°. In certain embodiments, angle β is from about 0° to about 45°. In certain embodiments, the rib 20 can be disposed at about a 90° angle between first layer 14 and the second layer 16.

In certain example embodiments, the angle θ may be defined between a surface of the first layer 14 and second layer 16 facing the rib 20, e.g., and at which the connectors 30*a*, 30*b* are positioned on the first and second layers 14, 16, respectively, and a central axis of the rib 20, e.g., along which the rib 20 extends between the first and second ends 22, 24.

Figure 5:
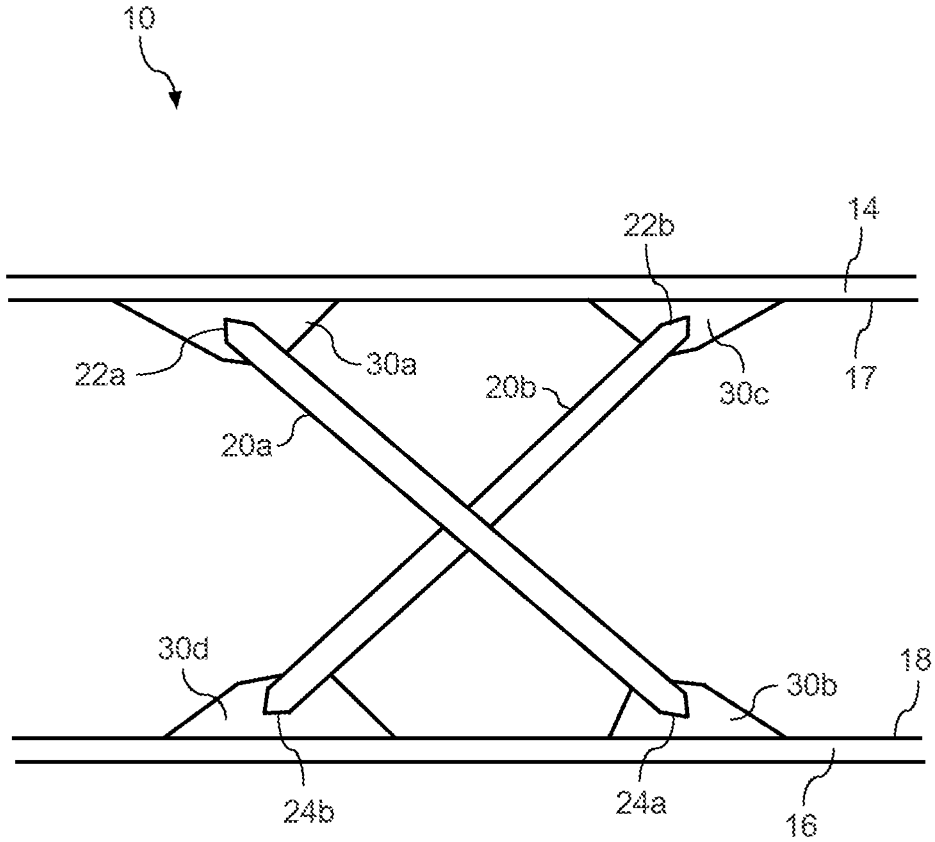
FIG. 5 is a cross-sectional view of a laminate material for a component of an aircraft in accordance with an example aspect of the present disclosure.

Furthermore, as shown in FIG. 5, the laminate 10 can include one or more ribs 20, such as a plurality of ribs 20 disposed between the first layer 14 and the second layer 16. The ribs 20*a*, 20*b* are disposed in a crisscross pattern across the inner surfaces 17, 18 of the first layer 14 and the second layer 16, respectively. Specifically, the first ends 22*a*, 22*b* of the ribs 20*a*, 20*b* are disposed on the inner surface 17 via connectors 30*a*, 30*c*, while the second ends 24*a*, 24*b* are disposed on the inner surface 18 of the second layer 16 via connectors 30*b*, 30*c*, respectively. Indeed, any number of ribs 20 and connectors 30 can be utilized in accordance with the present disclosure. Furthermore, the ribs 20 can be positioned at a variety of angles as desired.

Figure 6:
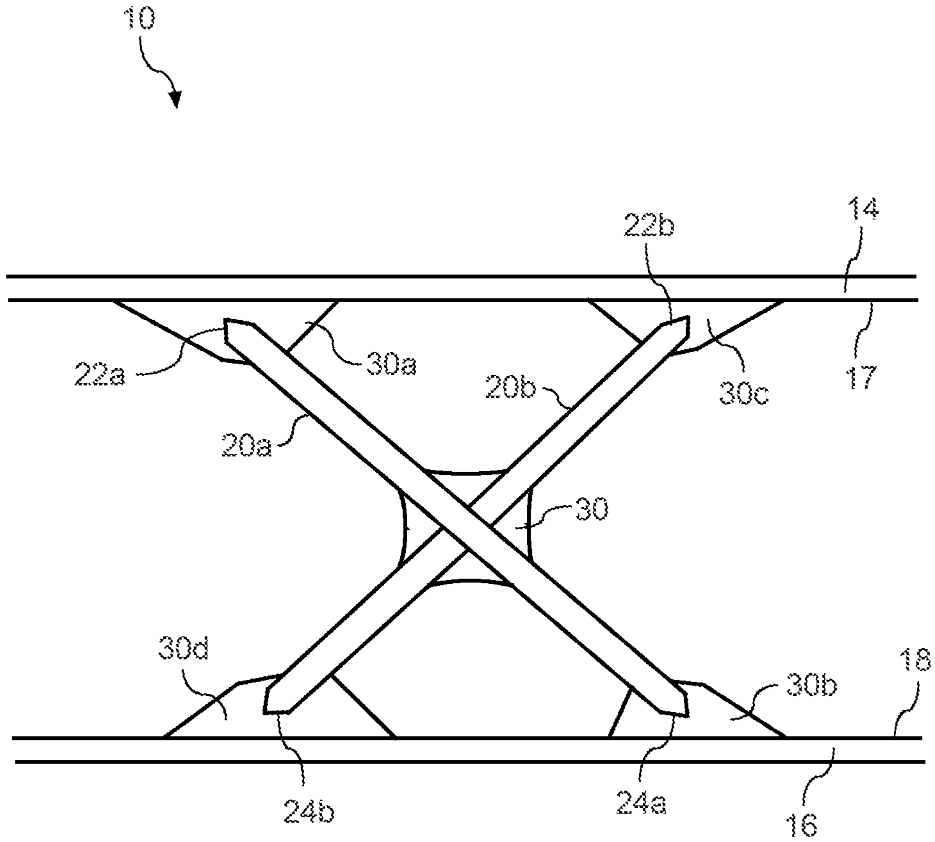
FIG. 6 is a cross-sectional view of a laminate material for a component of an aircraft in accordance with an example aspect of the present disclosure.

As, shown in FIG. 6, one or more connectors 30 can be included along ribs 20*a*, 20*b* in order to further connect ribs 20*a*, 20*b*. Disposing connectors 30 along the length of the ribs 20*a*, 20*b* can further facilitate shear load transfers from the first layer 14 or second layer 16 and/or among and between the ribs 20*a*, 20*b*.

As noted, the laminate 10 can be utilized to form components of an aircraft, such as wings, airfoils, blades, or portions thereof. Further, the laminate material can be used to form tail components or other portions of the fuselage of the aircraft. It should also be appreciated that the first layer 14 and the second layer 16 can each correspond to skins of a wing for an aircraft.

Figure 7:
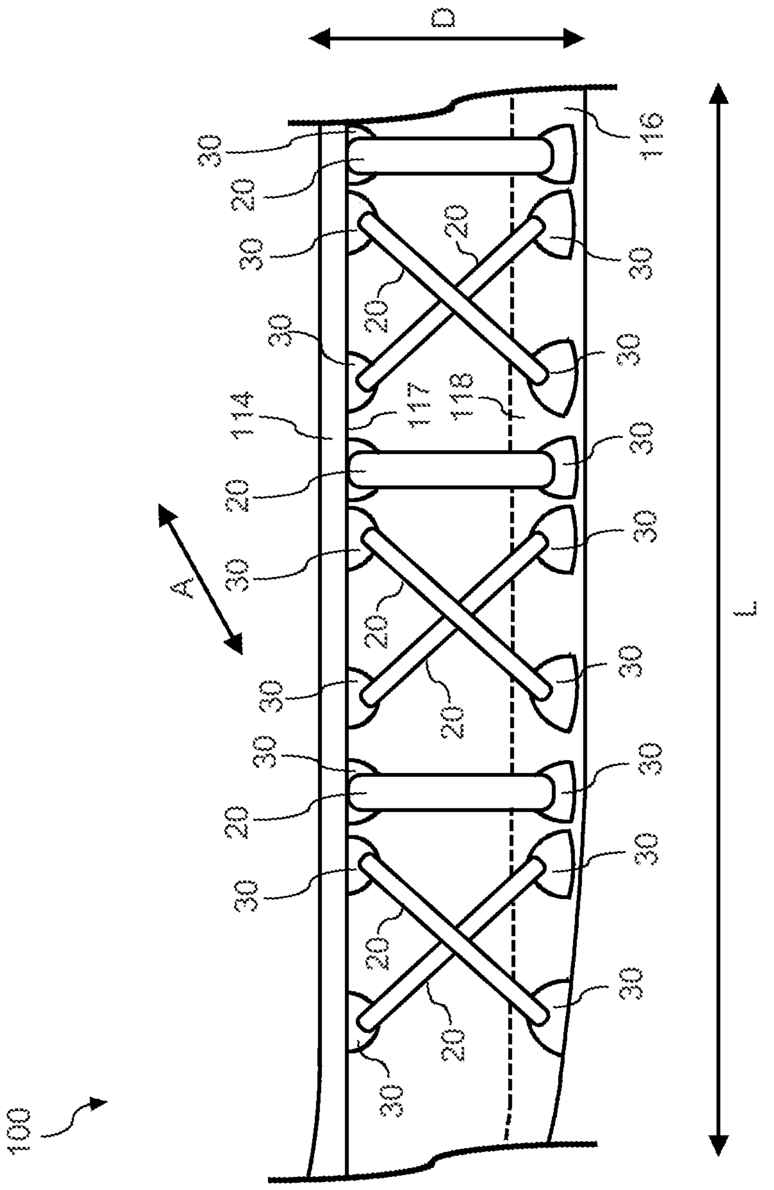
FIG. 7 is a cross-sectional view of an aircraft component, in this instance a wing, in accordance with an example aspect of the present disclosure.

For example, referring now to FIG. 7, depicted is a section of an aircraft wing 100 having a first skin 114 and a second skin 116. The wing is oriented having an axis (L) extending from the fuselage of the aircraft to the wing tip, an axis (D) extending from the top of the wing 100 to the bottom of the wing 100, and an axis (A) extending between the front and back portions of the aircraft. As shown, a plurality of ribs 20 are disposed between the first skin 114 and the second skin 116. Each of the ribs 20 are coupled to their respective skin utilizing the connectors 30 as disclosed herein. The ribs 20 can extend along axis (D) between the first skin 114 and the second skin 116 and can be positioned in any manner between the first skin 114 and the second skin 116. The ribs 20 can be secured to the skins 114, 116 by connectors 30.

Figure 8:
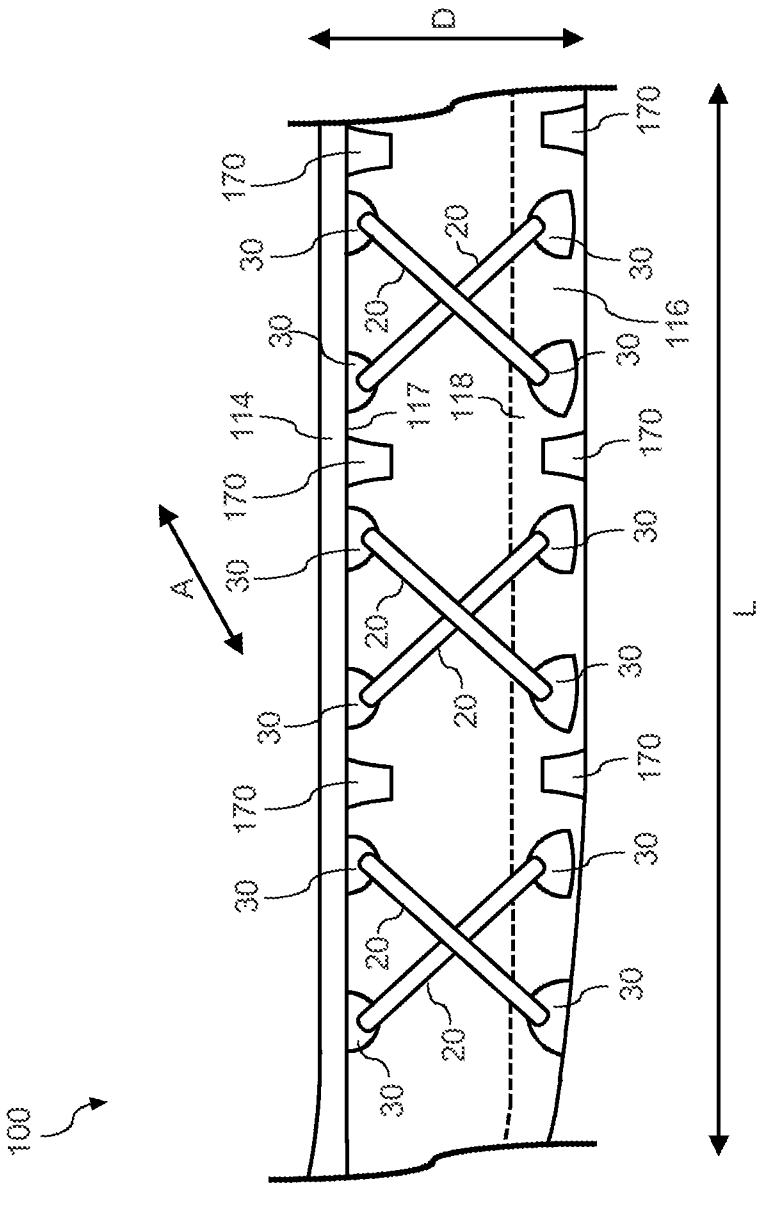
FIG. 8 is a cross-sectional view of an aircraft component, in this instance a wing, in accordance with an example aspect of the present disclosure.

As shown in FIG. 8, the wing 100 can include one or more stiffeners 170. Notably, the stiffeners 170 can be composed of the same materials as disclosed hereinabove with references to the connectors 30. For example, the stiffeners 170 can include a thermoplastic resin. Optionally, the thermoplastic resin can include fibers as disclosed herein. The stiffeners 170 can be disposed on the inner surface 117 of the first skin 114 and/or the inner surface 118 of the second skin 116. The stiffeners 170 have a modulus of elasticity that is less than the modulus of elasticity of the skins 114, 116. The stiffeners 170 can provide support to the first skin 114 or the second skin 116 and can also help prevent buckling of the skins 114, 116 under compression or shear loads.

Figure 9:
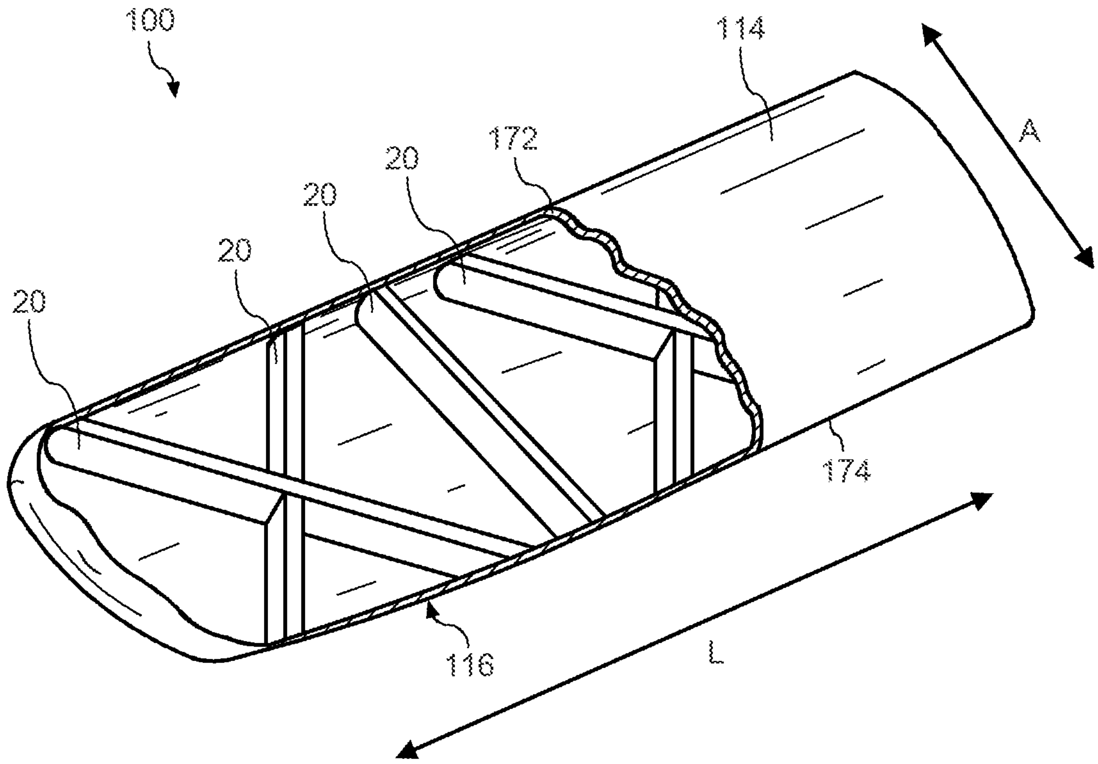
FIG. 9 is a cut-away view of an aircraft wing in accordance with an example aspect of the present disclosure.

As shown in FIGS. 9, the ribs 20 can extend along axis (A) from the leading edge 172 of the wing 100 to the trailing edge 174 of the wing 100. Although, not shown, the ribs 20 are connected to the skins 114, 116 utilizing the connectors 30. For example, the connectors 30 can be placed at multiple locations along axis (A) to secure the ribs 20 to skins 114, 116. To accommodate intersection of the ribs 20, as shown in FIG. 9, at least one of the ribs can be notched in order to facilitate a flush fit between two intercrossing ribs 20. Further, the ribs 20 can be configured in any manner known in order to allow for intercrossing of the ribs 20. Optionally, connectors 30 can be disposed along intersection interfaces between the two ribs 20.

Figure 10:
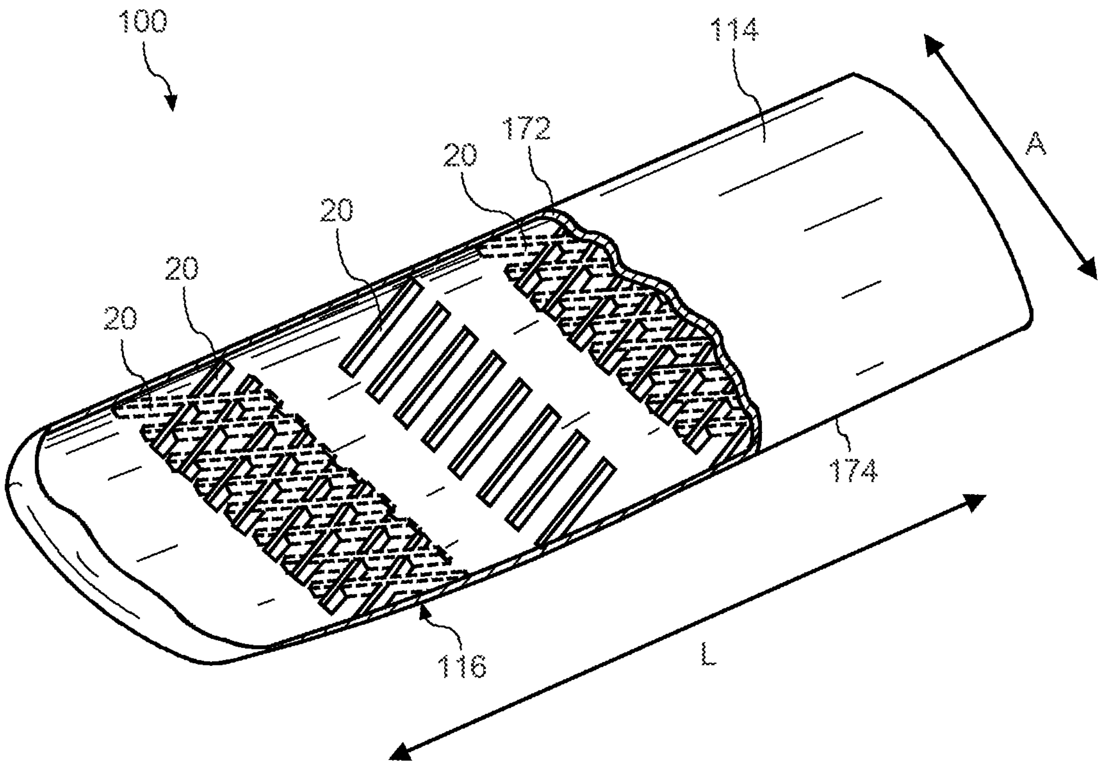
FIG. 10 is a cut-away view of an aircraft wing in accordance with an example aspect of the present disclosure.

As shown in FIG. 10, multiple ribs 20 are disposed between the first skin 114 and the second skin 116 from the leading edge 172 to the trailing edge 174 of the wing 100. As shown, the ribs 20 can extend between the first skin 114 and the second skin 116 or can be disposed at an angle with respect to the first skin 114 and the second skin 116. Notably, any number of ribs 20 or configurations of ribs 20 is contemplated herein. Utilization of a multi-rib 20 design as illustrated in FIG. 10 can be advantageous when other components (e.g., battery packs) need to be disposed within the cavity of the wing 100 (e.g., between skin 114 and 116). Notably, the ribs 20 can be placed around additional components disposed within the cavity of the wing 100 without sacrificing wing strength or the ability of the wing to efficiently transfer loads, such as compression, tension, and shearing loads.

Figure 11:
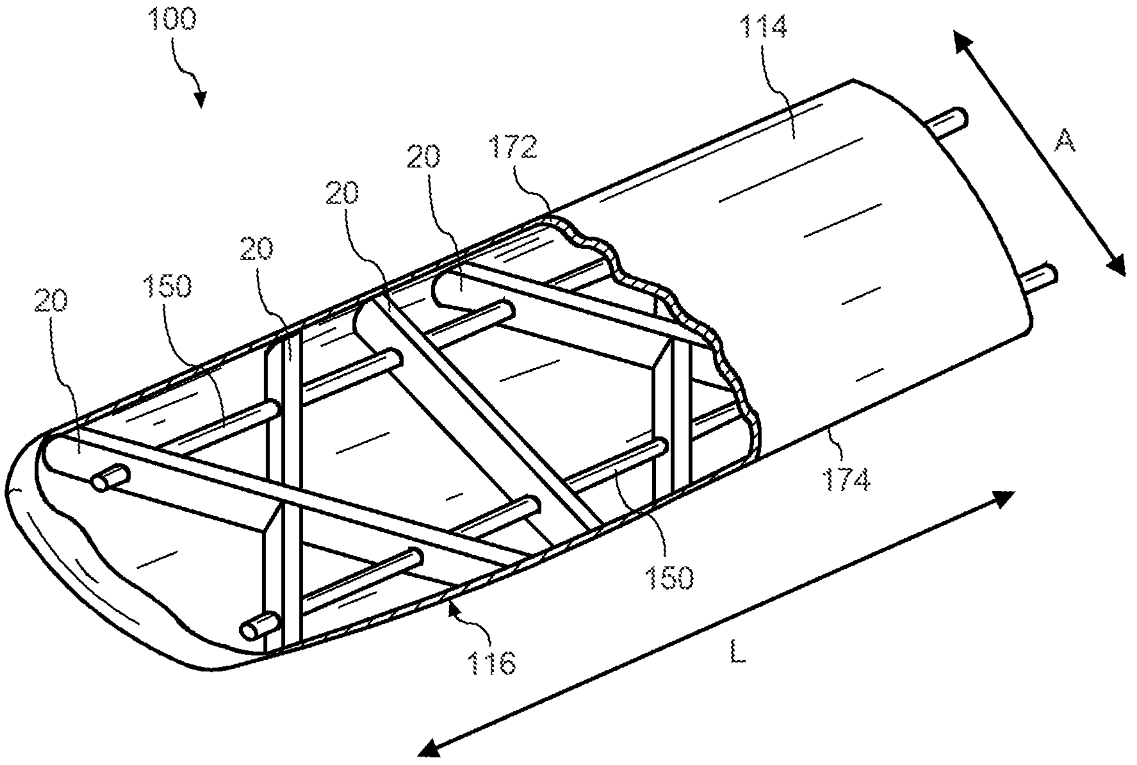
FIG. 11 is a cut-away view of an aircraft wing in accordance with an example aspect of the present disclosure.

Optionally, as shown in FIG. 11, one or more spars 150 are also disposed within the wing 100 and extend generally parallel along axis (L) (e.g., between the fuselage to the wing tip) in order to structurally support aircraft wing 100 and facilitate formation of the overall structure of the wing 100. While two spars 150 are shown, the disclosure is not so limited and any number of spars 150 may be utilized in accordance with the present disclosure. Moreover, the spars 150 can be placed at varying locations within the wing 100.

Additional wing components such as flaps, airelons, spoilers, rudders, or slats can also be disposed on the wing 100. (Not shown herein).

The skins 114, 116 and ribs 20 can be disposed in any manner to form an aircraft component. For example, the skins 114, 116 and ribs 20 can be disposed from fore to aft or can be disposed in a spanwise direction from wing tip to wing tip. Additionally, the skins 114, 116 and ribs 20 can be stacked, layered, or configured in any manner in order to produce an aircraft component.

Figure 12:
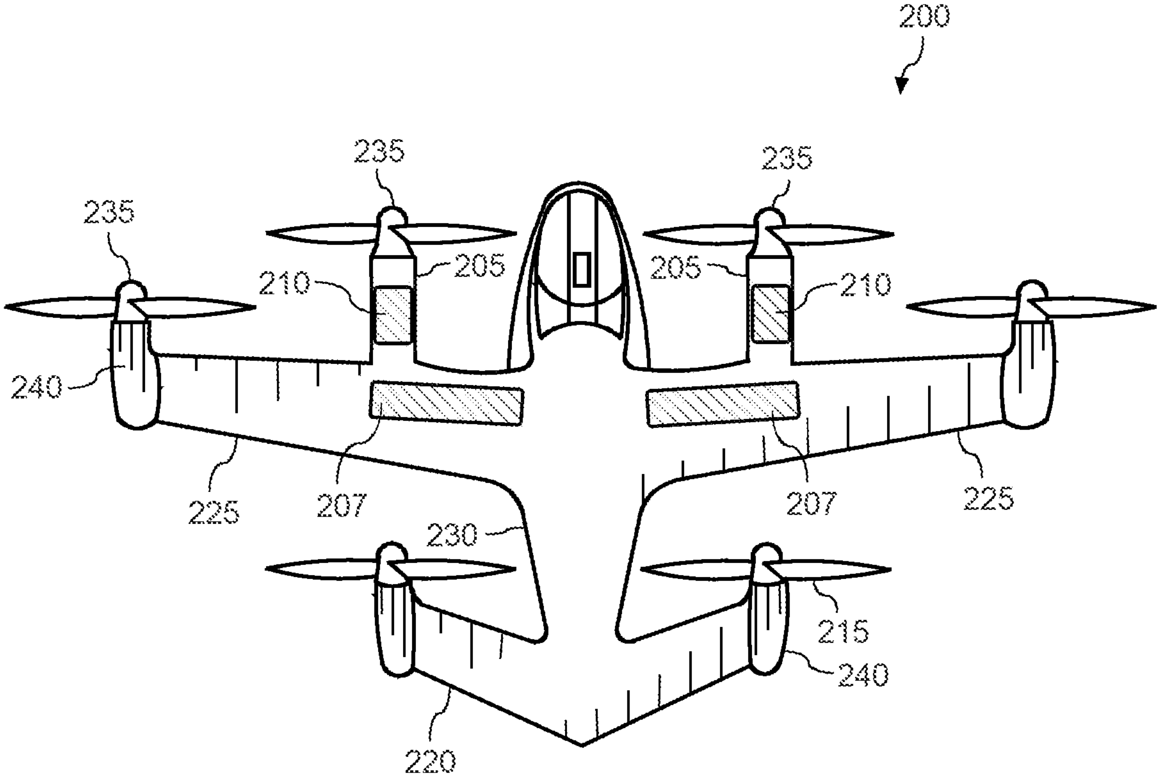
FIG. 12 is an example aircraft in accordance with an example aspect of the present disclosure.

FIG. 12 depicts an example aircraft 200 according to example implementations of the present disclosure. The aircraft 200 can be a VTOL aircraft that can perform a vertical lift and hover maneuver (e.g., to take-off and land) as well as perform a forward cruise maneuver. This can be accomplished by a moveable propulsion system such as, for example, rotor assemblies 235 that tilt/rotate to cause a lift force in one position and a thrust force in another position.

The aircraft 200 can include a fuselage 230, two wings 225, an empennage 220 and propulsion systems 215 embodied as tiltable rotor assemblies 235 located in nacelles 240.

The aircraft 200 includes one or more energy storage systems. The energy storage systems can include, for example, a nonlinear power source such as nacelle battery packs 210 or wing battery packs 207. In the illustrated example, while the nacelle battery packs 210 are located in inboard nacelles 205, it will be appreciated that the nacelle battery packs 210 can be located in other nacelles 240 forming part of the aircraft 900.

The aircraft 200 can include associated equipment such as an electronic infrastructure, control surfaces, a cooling system, landing gear and so forth.

The wings 225 function to generate lift to support the aircraft 200 during forward flight. The wings 225 can additionally or alternately function to structurally support the battery packs 207 or propulsion systems 215 under the influence of various structural stresses (e.g., aerodynamic forces, gravitational forces, propulsive forces, external point loads, distributed loads, and/or body forces, and so forth).

During take-off, landing, and cruising, the aircraft 200 is subjected to a variety of forces. Such forces are generally passed from component to component of the aircraft 200, which causes bending, twisting, pulling, compression, and shearing forces. Thus, connections between components can be subjected to shear forces during operation of the aircraft 200. For instance, shear forces along the wings 225 of the aircraft 200 act to cause one layer of material, such as skin 114, to slide over an adjacent or connected layer, such as skin 116, both shown in FIG. 6.

Accordingly, if the coupling mechanism between the skins 114, 116 is not adequate to handle the shearing force, the coupling mechanism would give way, allowing the skins to be pushed apart.

However, utilizing the laminate material 10 as shown in FIG. 1, and more specifically utilizing the connectors 30 to join wing skins together to construct portions or the entirety of the wings 225 more efficiently transfers shear forces along the wings 225 and from the wings 225 to the fuselage 230. Thus, the laminate material provided herein is capable of efficiently transferring shear forces preventing separation of the material layers used to form the wings 225. Notably, the laminate material disclosed herein is configured to facilitate shear load transfer from the layers or skins in a more efficient manner.

EXAMPLES

I-beams having different material connectors along the top and bottom joints of the I-beam were strain-tested. Example 1 included an I-beam having joints formed from a composite material including resin and chopped carbon fibers. Example 2 included an I-beam having joints formed from a composite material including resin and continuous fiberglass fibers. Example 3 included an I-beam having joints formed from a composite material including resin and chopped fiberglass fibers. The resin included a blend of PEEK, PAEK, and PEKK. The chopped fiberglass fibers had lengths under 0.5 inches. Each I-beam had a length of 300 mm, a height of 55 mm, and a width across the top and bottom of the I-beam of 60 mm. The top, bottom, and middle layers of each I-beam were formed from a ceramic composite material.

Each Example I-beam was then subjected to a strain test to determine % load-strain and load-displacement in millimeters. Each I-beam was placed on two steel arms. A third steel cylinder was used to apply a load on the middle of the I-beam between the two steel arms. Strains were collected using strain gauges attached to the beams.

Figure 13:
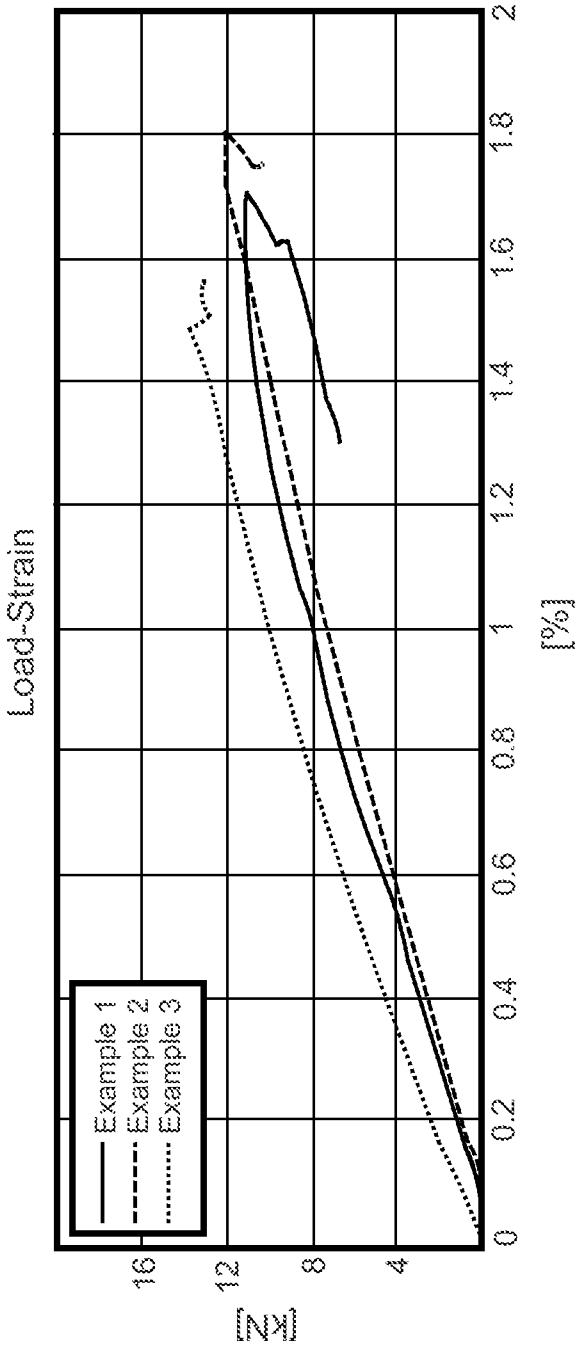
FIG. 13 illustrates the load-strain of laminate materials and comparative examples according to an example aspect of the present disclosure.
Figure 14:
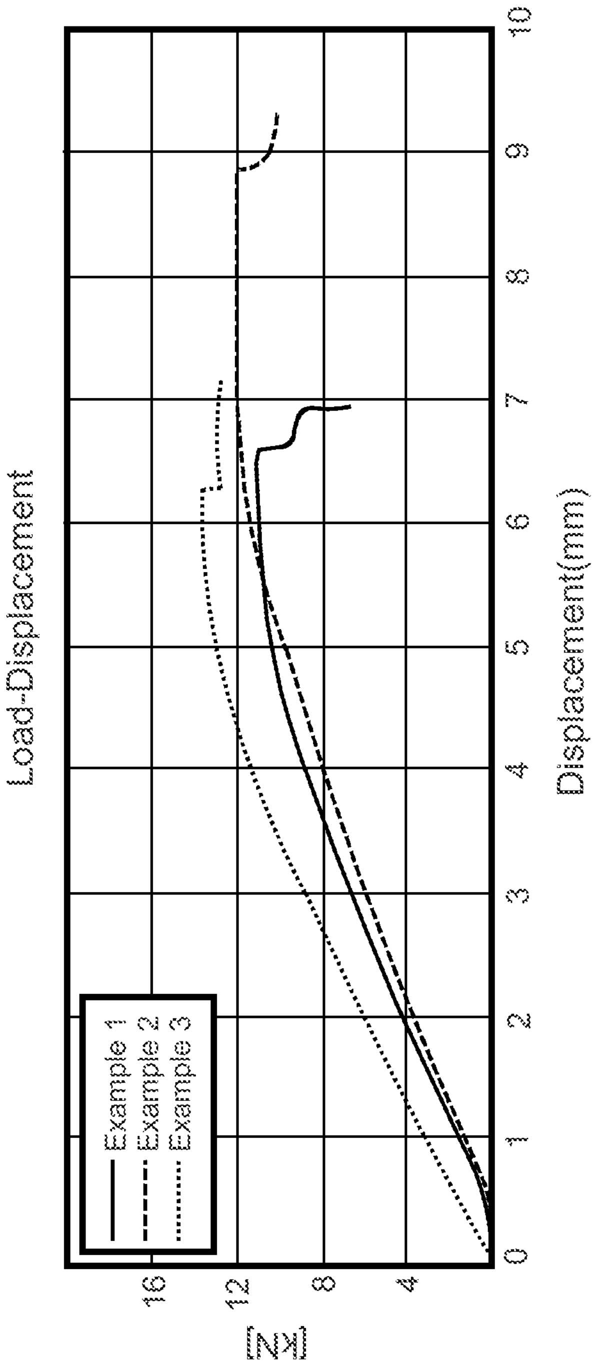
FIG. 14 illustrates the load-strain of laminate materials and comparative examples according to an example aspect of the present disclosure.

As show in FIGS. 13-14 the I-beam of Example 3 including a connector formed from a composite material including chopped fiberglass fibers and resin exhibited better load-strain and load-displacement as compared Examples 1 and 2.

The singular forms “a”, “an”, and “the” include plural references unless the context clearly dictates otherwise.

The term "at least one of" in the context of, e.g., "at least one of A, B, or C" refers to only A, only B, only C, or any combination of A, B, and C.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

The terms "coupled," "fixed," "attached to," and the like refer to both direct coupling, fixing, or attaching, as well as indirect coupling, fixing, or attaching through one or more intermediate components or features, unless otherwise specified herein.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply embodiments of the disclosure. Hence, specific dimensions and other physical characteristics related to the embodiments disclosed herein are not to be considered as limiting.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A laminate material comprising:
- a first layer and a second layer;
- a rib having a first end and a second end disposed between the first and second layer; and
- one or more connectors configured to couple the first end of the rib to the first layer and the second end of the rib to the second layer, the one or more connectors comprising a thermoplastic resin,
- wherein the thermoplastic resin comprises PEEK, PEKK, PPS, PAEK, or combinations thereof.

2. The laminate material of claim 1, wherein the connector has a modulus of elasticity that is lower than a modulus of elasticity of either the first layer or the second layer.

3. The laminate material of claim 1, comprising-A laminate material comprising:
- a first layer and a second layer;
- a rib having a first end and a second end disposed between the first and second layer; and one or more connectors configured to couple the first end of the rib to the first layer and the second end of the rib to the second layer, the one or more connectors comprising a thermoplastic resin and fibers disposed within the thermoplastic resin.

4. The laminate material of claim 3, wherein the fibers comprise fiberglass.

5. The laminate material of claim 3, wherein the fibers have a length of from about 0.25 inches to about 0.50 inches.

6. The laminate material of claim 3, wherein the fibers have a length of from about 0.1 inches to about 0.5 inches.

7. The laminate material of claim 3, wherein the fibers have a length of from about 0.01 mm to about 0.5 mm.

8. The laminate material of claim 1, wherein the thermoplastic resin comprises from about 25 wt. % to about 100 wt. % of the connector.

9. A laminate material comprising:
- a first layer and a second layer;
- a rib having a first end and a second end disposed between the first and second layer; and one or more connectors configured to couple the first end of the rib to the first layer and the second end of the rib to the second layer, the one or more connectors comprising a thermoplastic resin,
- wherein the first layer and the second layer comprise a carbon material.

10. A laminate material comprising:
- a first layer and a second layer;
- a rib having a first end and a second end disposed between the first and second layer; and one or more connectors configured to couple the first end of the rib to the first layer and the second end of the rib to the second layer, the one or more connectors comprising a thermoplastic resin,
- wherein the first layer and the second layer comprise a composite material.

11. The laminate material of claim 1, wherein the first layer and the second layer comprise a ceramic composite material.

12. A laminate material comprising:
- a first layer and a second layer;
- a rib having a first end and a second end disposed between the first and second layer; and one or more connectors configured to couple the first end of the rib to the first layer and the second end of the rib to the second layer, the one or more connectors comprising a thermoplastic resin,
- wherein angle $\beta$ is defined between the first layer and the first end of the rib, wherein angle $\beta$ is less than 90°.

13. The laminate material of claim 1, wherein the first end of the rib and the second end of the rib are tapered.

14. The laminate material of claim 1, wherein the one or more connectors have a first surface coupled to an inner surface of the first layer or second layer and a cavity into which the first end or second end of the rib is inserted.

15. The laminate material of claim 1, wherein the one or more connectors occupy a space between the first layer and the first end of the rib such that the first end of the rib is not in direct contact with an inner surface of the first layer.

16. The laminate material of claim 1, wherein the one or more connectors occupy a space between the second layer and the second end of the rib such that the second end of the rib is not in direct contact with an inner surface of the first layer.

17. The laminate material of claim 1, comprising a plurality of ribs and a plurality of the one or more connectors.

18. The laminate material of claim 1, comprising one or more strengthening structures disposed between the first layer and the second layer.

19. The laminate material of claim 1, wherein the one or more connectors are configured to facilitate shear load transfer from the first layer and/or the second layer.

* * * * *